(12) United States Patent
Anderson

(10) Patent No.: US 9,965,789 B2
(45) Date of Patent: May 8, 2018

(54) PRE-PURCHASE WEARABLE DEVICE TESTING

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 14/579,043

(22) Filed: Dec. 22, 2014

(65) Prior Publication Data

US 2016/0180429 A1   Jun. 23, 2016

(51) Int. Cl.
  *G06Q 30/06* (2012.01)
  *G06Q 20/20* (2012.01)
  *G06F 21/62* (2013.01)

(52) U.S. Cl.
  CPC ..... *G06Q 30/0625* (2013.01); *G06F 21/6245* (2013.01); *G06Q 20/20* (2013.01)

(58) Field of Classification Search
  USPC ........................................................ 235/375
  See application file for complete search history.

(56) References Cited

U.S. PATENT DOCUMENTS

| 2004/0006553 | A1 | 1/2004 | De Vries | |
|---|---|---|---|---|
| 2009/0273612 | A1* | 11/2009 | Xie | G02C 13/003 345/630 |
| 2010/0113011 | A1 | 5/2010 | Gregg et al. | |
| 2014/0181925 | A1 | 6/2014 | Smith et al. | |
| 2014/0366123 | A1 | 12/2014 | Dibona et al. | |
| 2015/0037781 | A1* | 2/2015 | Breed | G09B 7/00 434/362 |
| 2015/0094544 | A1* | 4/2015 | Spolin | A61B 5/7275 600/301 |
| 2015/0120617 | A1* | 4/2015 | C. | G06N 5/027 706/11 |
| 2015/0245722 | A1* | 9/2015 | Sanford | A47F 3/007 434/379 |
| 2016/0063587 | A1* | 3/2016 | Fry | G06Q 30/0621 705/26.5 |

FOREIGN PATENT DOCUMENTS

| WO | WO-2009138879 A2 | 11/2009 |
|---|---|---|
| WO | WO-2016105809 A1 | 6/2016 |

OTHER PUBLICATIONS

"International Application Serial No. PCT/US2015/062361, International Search Report dated May 11, 2016", 3 pgs.
"International Application Serial No. PCT/US2015/062361, Written Opinion dated May 11, 2016", 9 pgs.

* cited by examiner

*Primary Examiner* — Michael G Lee
*Assistant Examiner* — David Tardif
(74) *Attorney, Agent, or Firm* — Schwegman Lundberg & Woessner, P.A.

(57) ABSTRACT

Systems and techniques for pre-purchase wearable device testing are described herein. A wearable device may be identified as a trial device to a wearable ensemble. Trial data corresponding to the trial device may be provided to a wearable ensemble system that includes the wearable ensemble.

24 Claims, 5 Drawing Sheets

PRE-PURCHASE WEARABLE DEVICE TESTING

TECHNICAL FIELD

Embodiments described herein generally relate to device internetworking and more specifically to pre-purchase wearable device testing.

BACKGROUND

Wearable devices are devices designed to be worn on a body. Wearable devices may include sensors or processing capabilities to observe the body, or other information, and provide those observations or calculations made from those observations to people. In some cases, services may be paired with one or more wearable devices to provide data collection, analysis, or reporting to a user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As noted above, wearable (and other connected devices) devices may have supporting services. In some cases, one device is assigned to one service (i.e., a one-to-one pairing). Emerging, however, are the combination of multiple device ensembles and multiple services. For example, a wrist mounted heart rate monitor and bicycle-mounted monitor may work with each other and upload data to a web service that tracks the user's activities. The additional combinations of devices and services leads to greater complexity for a user trying to determine what benefit adding a new device or service to a wearable ensemble will provide. This complexity problem may cause trouble when users pay for new devices or services and thus may impact the sales of these products.

A system for pre-purchase wearable device testing may address the wearable device or service integration problem noted above. Consumers may pretest devices or services by integrating those trial devices or services into their existing wearable ensemble system. However, as some of the data that may be shared between the trial system and wearable ensemble system may implicate privacy concerns, the sharing includes protections for the user's private data. To facilitate this protection, the system maintains awareness of that data produced by the wearable device ensemble system and the trial system and limits sharing to data the user considers public. Further, trial system data is tracked in order to remove it, or otherwise clean it up, at the end of the testing. At purchase time, the user may assign a device to various services to deliver the final desired experience or to get incentives for sharing data with various systems. Additional details are provided below.

Figure 1:
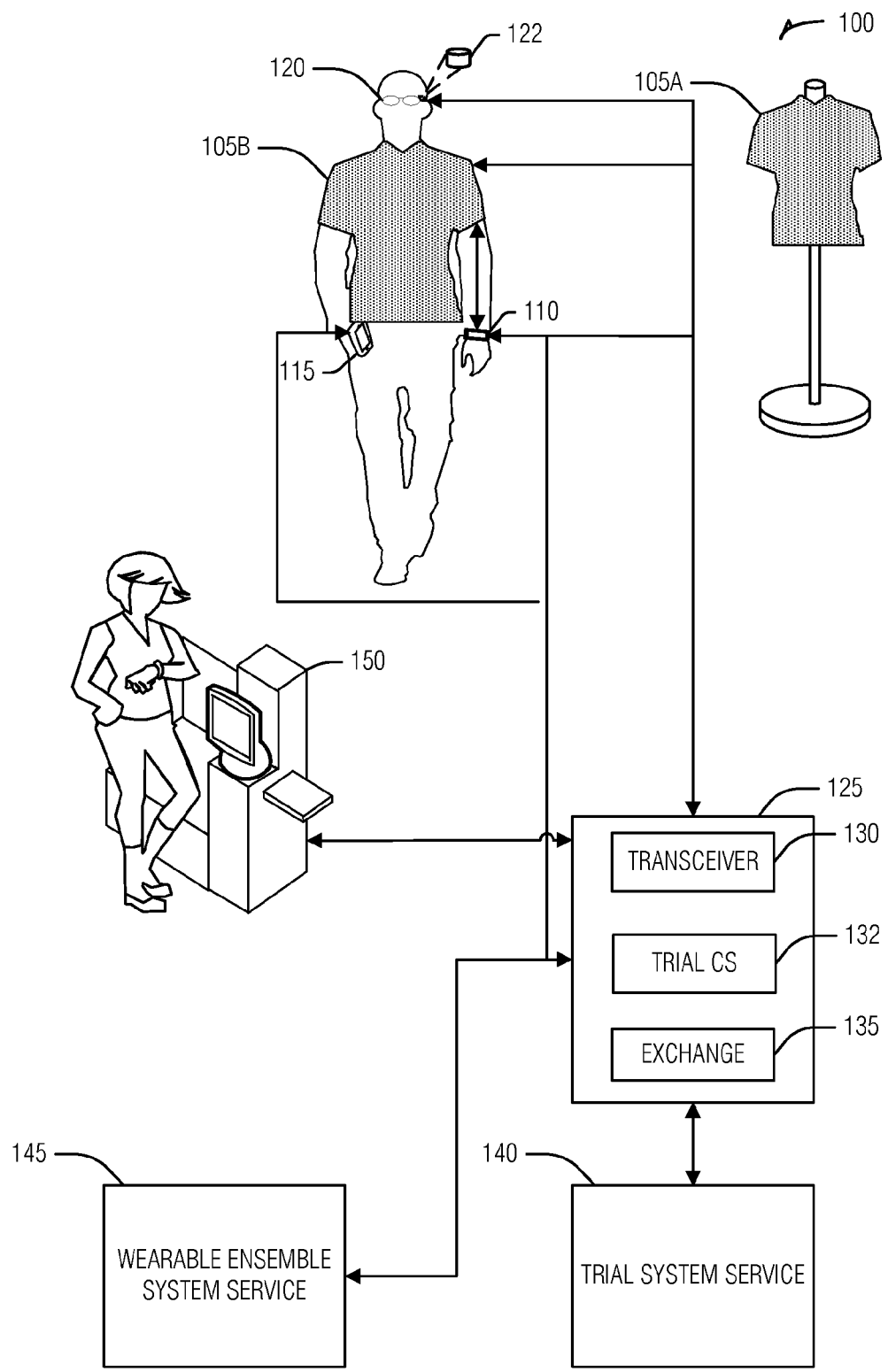
FIG. 1 is a block diagram of an example of a system for pre-purchase wearable device testing, according to an embodiment.

FIG. 1 is a block diagram of an example of a system 100 for pre-purchase wearable device testing, according to an embodiment. The system 100 may include a demonstration coordinator 125 that, when in operation, may be communicatively coupled to any or all of a wearable device 105A, trial device 105B, a wearable ensemble (e.g., watch 110, cellular phone 115, and smart glasses 120), a wearable ensemble system service 145, a trial system service 140, or a point-of-sale system 150. The demonstration coordinator 125 may include a transceiver 130, a trial circuit-set 13, and an exchange 135. In various examples any or all of the transceiver 130 or the exchange 135 may be located in the point-of-sale system 150 or in the trial device 105. As illustrated, the wearable device 105A is a shirt on display at a shopping venue and the trial device 105B is the shirt after having been donned by the user.

As used herein, wearable ensembles include devices with integrated sensors (e.g., microphones, cameras, accelerometers, gyroscopes, touch sensors, deformation sensors, distance sensors, pulse sensors, galvanic skin response sensors, etc.), sensor processors (e.g., body morphology determiners to determine posture, gait, pace, heart rate, etc., from the sensor data), wireless (e.g., including Internet) connectivity, and possibly output interfaces such as visual (e.g., displays, lights, etc.), audio (e.g., speakers, chirpers, etc.), olfactory (e.g., scent releasing actuators), or haptic (e.g., vibrators, electro-stimulators, etc.) feedback mechanisms. The devices of a wearable ensemble may connect and communicate through a number of connectivity standards, such as Bluetooth®, body coupled communications (BCC), or other personal area network (PAN) or local wireless area network (WLAN) standards. Moreover, the wearable ensemble connectivity standard may define a normalized way in which data is queried or shared amongst the wearable ensemble system members, including devices and services.

Further, devices and services in the wearable ensemble system may be authenticated with one another in order to secure the user's personal network. This authentication may work with a gatekeeper that safely stores data generated by the wearable ensemble and controls what data is sharable to wearable devices or services based on the credentials of those devices and services. Thus, the user's personal data may be protected against eavesdropping as well as direct queries by unauthorized requesters.

The transceiver 130 may be arranged (e.g., configured, constructed, designed, etc.) to identify the wearable device 105A as a trial device 105B to the wearable ensemble. In an example, to identify the wearable device 105A as the trial device 105B to the wearable ensemble may include the transceiver 130 to receive identification of the trial device 105B from the point-of-sale system 105 in a retailing venue. Thus, the point-of-sale system 150 may be used by a clerk of the venue to enable the trial mode of the wearable device 105A. In an example, the wearable device 105A may include a demonstration mode that is in operation at the shopping venue and disabled when the wearable device 105A is purchased. In this example, the demonstration mode may act as a form of theft deterrent as the wearable device 105A may be permanently hobbled by its inability to fully integrate with the wearable ensemble. In an example, a trial circuit-set 132 may be integrated into the transceiver 130, or may be communicatively coupled to the transceiver to identify the wearable device 105A as a trial device 105B to the wearable ensemble. Thus, the transceiver 130 may operate to process incoming and outgoing communications to the trial circuit-set 132, and the trial circuit-set 132 performs analysis on that data to ascertain that the wearable device 105 A is the trial device 105 B.

The exchange 135 may be arranged to provide trial data corresponding to the trial device 105B to the wearable ensemble system. As used herein, the wearable ensemble system includes the devices that are part of the wearable ensemble (e.g., watch 110, cellular phone 115, and smart glasses 120) and the services that work with the wearable ensemble (e.g., the wearable ensemble system service 145). The exchange 135 is implemented in computer hardware, such as a circuit-set as described below with respect to FIG. 5.

In an example, the exchange 135 may be arranged to provide a subset of wearable ensemble system data to a trial system. As used herein, the trial system includes the trial device 105B and any corresponding services, such as trial system service 140. In an example, the subset of wearable ensemble data may be selected based on a user defined privacy classification. Thus, the user may specify which of their personal data generated by the wearable ensemble to share with the possibly untrusted trial system components. In an example, the user defined privacy classification may include the classification "public data" denoting that data which the user is comfortable sharing with any requester. In this example, the subset of wearable ensemble data may be limited to that data which is classified as public data.

In an example, the user-defined privacy classification may be a member of a set of privacy classifications. In this example, each of the set of privacy classifications may have a corresponding key. In an example the data of any given classification is provided by a query engine that will release the data when the corresponding key is provided. In an example, the data is encrypted with the key. In this example, the data may be provided upon request, but will only be usable if the requester possesses the key. The subset of wearable ensemble data may be selected based on a correspondence between a first key provided by the trial system and a second key corresponding to the subset of wearable ensemble data. That is, the selected data may be any data for which the trial system has the key. Thus, a user may provide the trial system two keys (e.g., at the point-of-sale system 150) corresponding to two of four security classifications. In this example, the subset of selected data may include any or all data from the two security classifications corresponding to the two keys. Thus, a given wearable device (e.g., glasses 120) may store data so that certain queries for data may be allowed or disallowed. In an example, the first key is obtained from a communication with the wearable ensemble (e.g., as illustrated in the connected between the watch 110 and the trial device 105B) and received by the transceiver 130. In this example, the exchange 135 may provide the key for trial queries.

In an example, the device (e.g., glasses 120) may store data that is sharable with the trial system in a database 122 that makes the level of data access variable by the credentials passed in the query. For example, wearable ensemble system service 145 may pass an encrypted key to the glasses 120 to get full access to all data. The trial system service 140 would not have access to that same encrypted key, but it would have another encrypted key that allows access to only a portion of the database 122 that is marked as the user's demonstration data. In an example, the wearable device (e.g., the glasses 120) may not have sufficient resources (e.g., processing or storage resources) to handle the data query directly. In this example, the wearable device may delegate the query handling to another device, such as the phone 115.

In an example, the trial data may be generated by the trial device 105B. For example, if the trial device 105B provides a pulse sensor, the pulse of the user may be provided when the trial device 105B is worn may be provided to the wearable ensemble system. In an example, the trial data may be generated by the trial device 105B. In this example, the heart rate of the user may be computed by an internal clock in conjunction with the pulse sensor data and provided to the wearable ensemble system. In an example, the trial data may be generated from a service that is included in the trial system, such as the trial system service 140. For example, the heart rate of the user may be shared with the trial system service 140 where it is combined with demographic information about the user to provide a health report to the wearable ensemble system. In an example, the data is pre-generated data that conforms to output of the trial device 105B or the trial system service 140. In this example, the pre-generated data is constructed to demonstrate the capabilities of the trial device 105B or the trial system service 140. For example, if the shirt 105B has a thermometer, such a sensor may be uninteresting in an indoor environment that is common in shopping venues. By providing sample data of the sensor's output, the user may observe how adding this sensor to the wearable ensemble system affects that system.

In an example, to provide trial data includes the exchange 135 to digitally tag the trial data. The tag may permit at least one of a service (e.g., the wearable ensemble system service 145) or device (e.g., any of the watch 110, the phone 115, or the glasses 120) of the wearable ensemble system to identify the trial data. In an example, the tag is added to the data itself. In an example, the tag is included in a message in which the data is communicated. In an example, the tag is included as a signal in a handshaking protocol indicating to the recipient the trial nature of the data.

In an example, to provide trial data may include the exchange 135 to direct a member of the wearable ensemble system to store in the trial data in segregated storage. In an example, the segregated storage may be separately identifiable to the member from data provided by itself or another member of the wearable ensemble. That is, the segregated storage is identifiably separate from other data handled by the member. In an example, the segregated storage may be a distinct physical or logical partition of the member's storage apparatus. In an example, the segregated storage may be an index or field designation of the trial data, such as is used in a managed database (e.g., database 122). In an example, the tag permits the receiver to identify or remove the trial data at the end of a trial period (e.g., after a time limit, after the trial device 105B is removed in the shopping venue, etc.).

In an example, the demonstration coordinator 125 may optionally include a profiler arranged to provide a report to the user of additional functionality of the wearable ensemble achieved by incorporation of the trial device 105B into the wearable ensemble. In an example, the additional functionality may include functionality provided by a service of the trial system, such as the trial system service 140. The profiler may observe the interaction between the provided trial data and the wearable ensemble system, the wearable ensemble system data provided to the trial system, or data sheets detailing the functionalities of any components of the wearable ensemble system and the trial system to produce the report. In an example, the report may include a sales incentive corresponding to one or more of the detailed additional functionalities. For example, to encourage the sale of the shirt 105, the report may include a listed additional functionality of the thermometer capability as well as an offer for a year of free service of the corresponding trial system service 140.

in an example, the demonstration coordinator 125 may optionally process user feedback about the trial experience. Such feedback may include whether the user liked the trial product 105 B or what features the user did or did not like. In an example, the demonstration coordinator 125 may provide a list of features that were not liked. In an example, the user may be provided a discount on the trial product 105 B in response to the number or type of features that were not liked. In an example, positive feedback may indicate that the product 105 B was enjoyed but was too expensive. Such feedback may be elicited from the trial of the device 105 B where it otherwise would not be forthcoming. In an example, prompting the user for feedback occurs after a device trial that does not end in purchasing the device 105 B. By tracking the user's perceptions of the trial, past experiences with the device 105 B may be used to tailor future overtures (e.g., invitations, offers, etc.) to the user regarding the product 105 B.

The following is an example shopping scenario enabled by the system 100. Paul is at a clothing retailer and wearing the wristband wearable device that he already owns. Paul finds a biking shirt that he likes. He reads the shirt's product description tag and notes that the shirt is a wearable device compatible with his wearable ensemble system. The tag says that the shirt may measure heart rate and temperature (e.g., outdoor temperature while riding), and that it creates haptic feedback. Paul tries on the shirt and sees on his wristband that the shirt is detected. Paul accepts a trial mode pairing message that appears on his wristband. He gets feedback from his existing health service via the shirt's haptic output about his heart rate relative to baseline. He also sees he may access data from a new cloud service in the trial system that tracks health across men his age. At a point of sale the clerk offers to allow Paul to add the new shirt to his wearable ensemble system in order to try it out with his wearable device ensemble. Paul declines since he has already paired it with his wristband. Paul also sees on his smartphone that the new shirt is working as part of the system. He may read about the new capabilities of his wearable ensemble system with the new shirt added.

Figure 2:
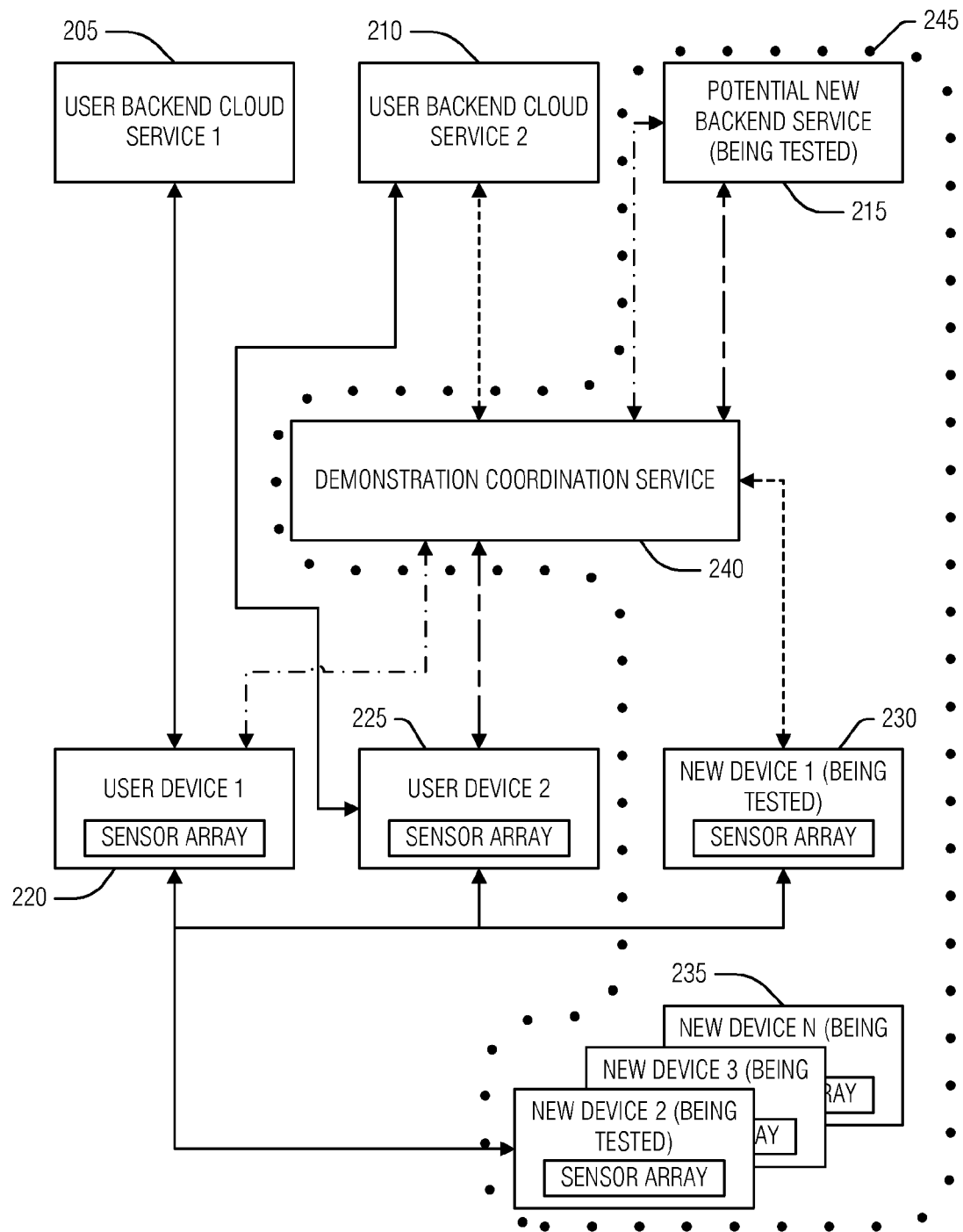
FIG. 2 is a block diagram of an example of a system for pre-purchase wearable device testing, according to an embodiment.

FIG. 2 is a block diagram of an example of a system 200 for pre-purchase wearable device testing, according to an embodiment. The system 200 may include user wearable ensemble devices 220 and 225, wearable ensemble system services 205 and 210, and a trial system 245. The trial system 245 may include new device 230, other new devices 235, trial system service 215, and a demonstration coordination service. As illustrated, communication paths through the demonstration coordination service 240 from the various components are uniquely dashed. For example, the communication from the user device 1 220 to the potential new backend service 215 is represented by two lines with a dash-dot signature connecting to the demonstration coordination service 240. Further, the trial system 245 includes the components in within the shape denoted by a large dotted border.

As illustrated, the communications from or to the trial devices 230 or 235, or the trial service 215 pass through the demonstration coordination service 240. Thus, the demonstration mode character of these trial system 245 components may be managed at a single juncture. The demonstration coordination service 240 may perform one or more of the demonstration coordinator operations discussed above with respect to FIG. 1. As such, it may facilitate, during pre-purchase testing, the device 230 reporting its status as in pre-purchase testing mode to the user's exiting services 205 and 210, thus allowing the user to try out various features without contaminating workout history or device ensemble history with a device that is not purchased. Further, the demonstration coordination service 240 may facilitate, at the point-of-sale, pairing the trial device 230 and consumer wearable devices 220 and 225 with multiple backend services, such as services 205, 210, and 245. The a single sensor of one or the devices 220, 225, or 230 may contribute data in various formats and sampling rates to various services, for example, via translation performed by the demonstration coordination service 240.

In an example, the demonstration coordination service 240 may provide a determination of the capabilities that the user may attain with his or her existing devices 220 and 225, and one 230 or more 235 new ones. In an example, this determination may include subsidizing one or more services 2145 or devices 235, depending on the configuration. For example, the user may get a free device by adding the trial device 230 and increasing certain data sharing. In an example, the demonstration coordination service 240 may be arranged to provide a purchasing assistance display (e.g., via a user device such as phone or a point-of-sale system) that shows what features are being enabled as the user adds and removes new devices/services from the test configuration. In an example, the demonstration coordination service 240 may be arranged to access profiles of the user's other devices (at home) to anticipate how they would work within the configuration. Thus, a simulated wearable ensemble that includes devices possessed by the user but not currently on the user may be tested to determine what benefit the trial device 230 may provide.

Figure 3:
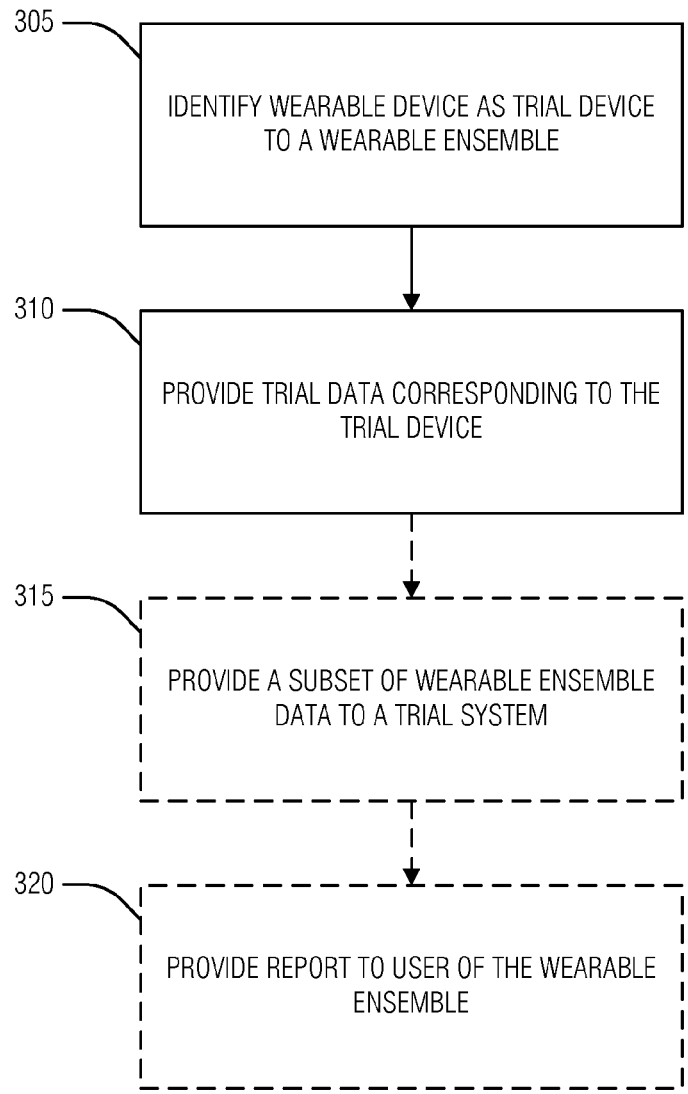
FIG. 3 illustrates an example of a method for pre-purchase wearable device testing, according to an embodiment.

FIG. 3 illustrates an example of a method 300 for pre-purchase wearable device testing, according to an embodiment. The operations of the method 300 are performed by computer hardware, such as circuit-sets, as described below with respect to FIG. 5.

At operation 305, a wearable device may be identified as a trial device to a wearable ensemble. In an example, identifying the wearable device as a trial device to the wearable ensemble may include receiving identification of the trial device from a point-of-sale system in a retailing venue.

At operation 310, trial data corresponding to the trial device may be provided to the wearable ensemble system, where the wearable ensemble is part of the wearable ensemble system. In an example, the trial data may be generated by the trial device. In an example, the trial data may be generated by a sensor of the trial device. In an example, the trial data may be generated by a service that is included in the trial system. In an example, the trial data may be pre-generated data that conforms to output of the trial device.

In an example, providing the trial data may include tagging the trial data. In this example the tag is structured so as to permit at least one of a service or device of the wearable ensemble system to identify the trial data. Such identification may be used to remove the trial data at the end of a trial period (e.g., when the user removes the trial device in the store). In an example, providing trial data may include directing a member of the wearable ensemble system to store the trial data in segregated storage. In this example, the segregated storage is separately identifiable to the member from data provided by it or another member of the wearable ensemble.

At optional operation 315, a subset of wearable ensemble system data may be provided to a trial system, where the trial system includes the trial device. In an example, the subset of wearable ensemble data may be selected based on a user defined privacy classification. In an example, the user defined privacy classification may include the classification public data. In this example, the subset of wearable ensemble data may be the data classified as public-data. In an example, the user defined privacy classification may be a member of a set of privacy classifications, where each of the set of privacy classifications having a corresponding key. In this example, the subset of wearable ensemble data may be selected based on a correspondence between a first key provided by the trial system and a second key corresponding to the subset of wearable ensemble data. In an example, the first key may be obtained from a communication with the wearable ensemble system and provided by the exchange.

At optional operation 320, a report may be provided to a user of additional functionality of the wearable ensemble (or wearable ensemble system) achieved by incorporation of the trial device into the wearable ensemble. In an example, the additional functionality may include functionality provided by a service of the trial system.

Figure 4:
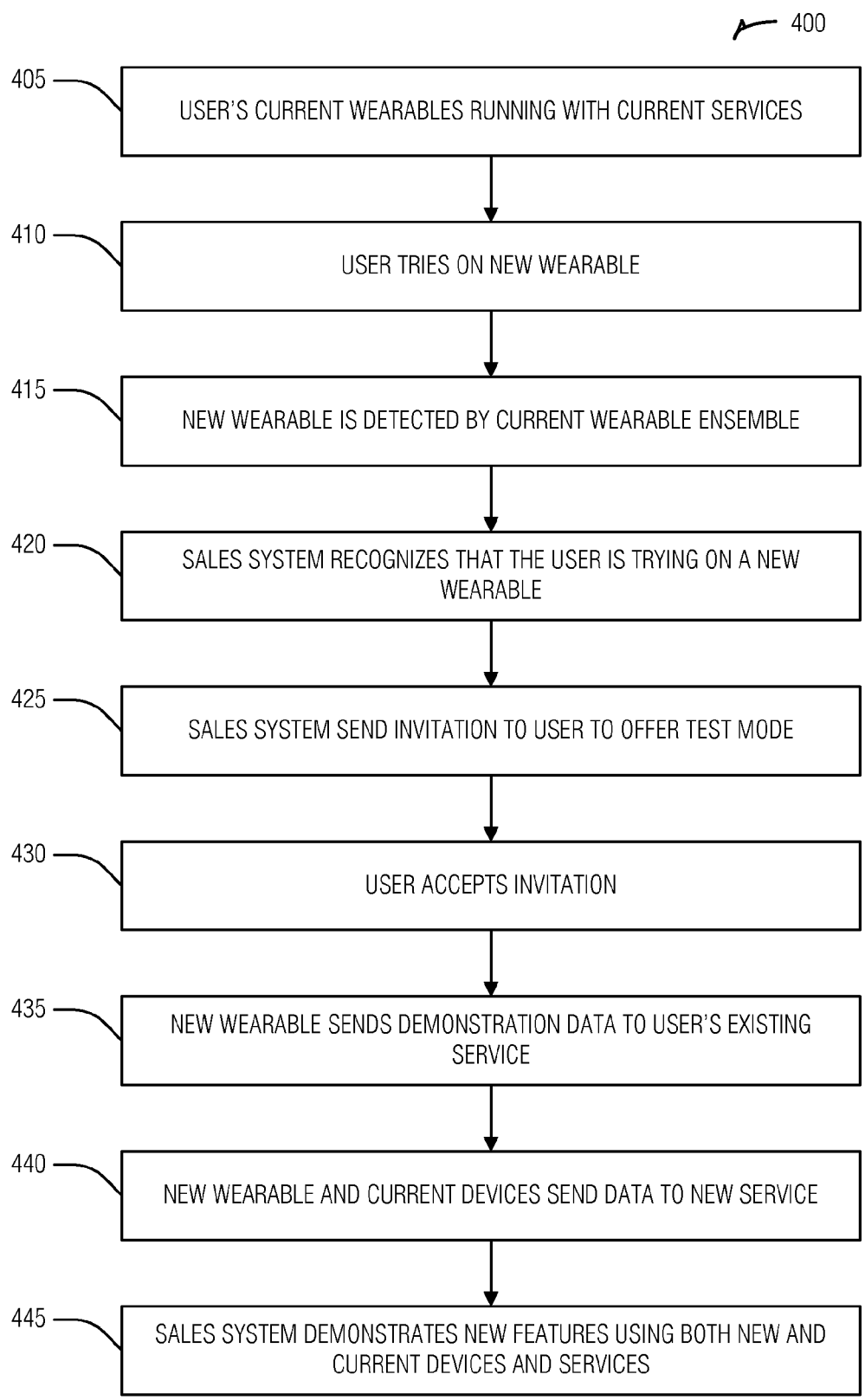
FIG. 4 illustrates an example of a method for pre-purchase wearable device testing, according to an embodiment.

FIG. 4 illustrates an example of a method 400 for pre-purchase wearable device testing, according to an embodiment. The operations of the method 400 are performed by computer hardware, such as circuit-sets, as described below with respect to FIG. 5. The method 400 illustrates a typical workflow during a shopping visit.

At operation 405, the user enters a shopping venue with a wearable ensemble that is part of a wearable ensemble system of the user. The wearable ensemble system includes one or more services operating with the wearable ensemble.

At operation 410, the user tries on a new wearable device.

At operation 415, the new wearable device is detected by the current wearable ensemble. At this juncture the current wearable ensemble does not accept the new device, but rather notes its accessibility.

At operation 420, a sales system at the shopping venue recognizes that the user is trying on a new wearable that is controlled by the shopping venue.

At operation 425, the sales system transmits an invitation to the user to test the new wearable in a test mode.

At operation 430, the user accepts the invitation. At this juncture the wearable ensemble is informed to integrate the new wearable device. However, due to the test mode, the new wearable device is afforded a trial level of trust rather than being considered an equal participant in the wearable ensemble.

At operation 435, the new wearable device sends demonstration data to the user's existing wearable ensemble system service. Thus, the user may see how the new wearable impacts his existing services.

At operation 440, the new wearable or the current wearable ensemble devices or services send data to a new service that is part of the new wearable device trial system. Thus, the user may observe what additional functionality the trial service may provide.

At operation 445, the sales system demonstrates new features using both new and current devices and services. At this juncture the sharing of data permits the sales system to provide a report of the new features. In an example, the new features may be provided as a difference between the user's current capabilities and those of the trial system. Thus, the user may make an informed decision as to whether or not to purchase the new wearable device.

Figure 5:
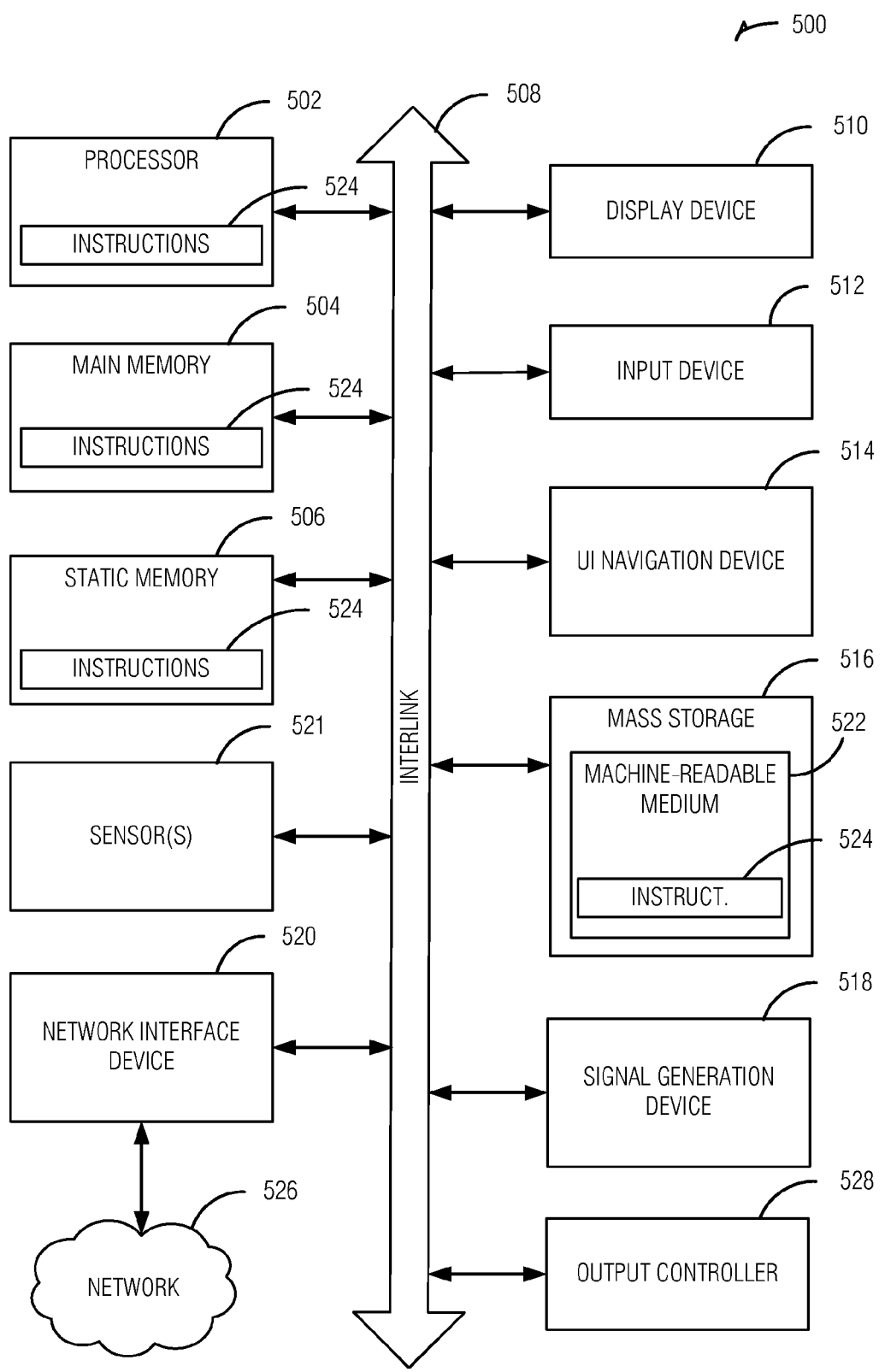
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit-sets (also known as a group of circuits or circuit-groups) are a collection of circuits implemented in tangible entities that include hardware (e.g., simple circuits, gates, logic, etc.). Circuit-set membership may be flexible over time and underlying hardware variability. Circuit-sets include members that may, alone or in combination, perform specified operations when operating. In an example, hardware of the circuit-set may be immutably designed to carry out a specific operation (e.g., hardwired). In an example, the hardware of the circuit-set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit-set in hardware via the variable connections to carry out portions of the specific operation when in operation. Accordingly, the computer readable medium is communicatively coupled to the other components of the circuit-set member when the device is operating. In an example, any of the physical components may be used in more than one member of more than one circuit-set. For example, under operation, execution units may be used in a first circuit of a first circuit-set at one point in time and reused by a second circuit in the first circuit-set, or by a third circuit in a second circuit-set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 may include subject matter (such as a device, apparatus, or a system for pre-purchase wearable device testing) comprising: a transceiver to identify a wearable device as a trial device to a wearable ensemble; and an exchange to provide trial data corresponding to the trial device to a wearable ensemble system, the wearable ensemble system including the wearable ensemble.

In Example 2, the subject matter of Example 1 may optionally include, wherein the exchange is further to provide a subset of wearable ensemble system data to a trial system, the trial system including the trial device.

In Example 3, the subject matter of Example 2 may optionally include, wherein the subset of wearable ensemble data is selected based on a user defined privacy classification.

In Example 4, the subject matter of Example 3 may optionally include, wherein the user defined privacy classification includes the classification public-data, and wherein the subset of wearable ensemble data is classified as public-data.

In Example 5, the subject matter of any of Examples 3-4 may optionally include, wherein the user defined privacy classification is a member of a set of privacy classifications, each of the set of privacy classifications having a corresponding key, and wherein the subset of wearable ensemble data is selected based on a correspondence between a first key provided by the trial system and a second key corresponding to the subset of wearable ensemble data.

In Example 6, the subject matter of Example 5 may optionally include, wherein the first key is obtained from a communication with the wearable ensemble system and provided by the exchange.

In Example 7, the subject matter of any of Examples 1-6 may optionally include, wherein the trial data is generated by the trial device.

In Example 8, the subject matter of Example 7 may optionally include, wherein the trial data is generated by a sensor of the trial device.

In Example 9, the subject matter of any of Examples 1-8 may optionally include, wherein the trial data is pre-generated data that conforms to output of the trial device.

In Example 10, the subject matter of any of Examples 1-9 may optionally include, wherein the trial data is generated from a service that is included in the trial system.

In Example 11, the subject matter of any of Examples 1-10 may optionally include, wherein to provide trial data includes the exchange to tag the trial data, the tag permitting at least one of a service or device of the wearable ensemble system to identify the trial data and remove the trial data at the end of a trial period.

In Example 12, the subject matter of any of Examples 1-11 may optionally include, wherein to provide trial data includes the exchange to direct a member of the wearable ensemble system to store the trial data in segregated storage, the segregated storage being separately identifiable to the member from data provided by itself or another member of the wearable ensemble.

In Example 13, the subject matter of any of Examples 1-12 may optionally include, wherein to identify the wearable device as a trial device to the wearable ensemble includes the transceiver to receive identification of the trial device from a point-of-sale system in a retailing venue.

In Example 14, the subject matter of any of Examples 1-13 may optionally include a profiler to provide a report to a user of additional functionality of the wearable ensemble achieved by incorporation of the trial device into the wearable ensemble.

In Example 15, the subject matter of Example 14 may optionally include, wherein the additional functionality includes functionality provided by a service of the trial system.

Example 16 may include, or may optionally be combined with any of Examples 1-15 to include, subject matter (such as a method, means for performing acts, or a machine readable medium including instructions for a machine to perform acts when executed) comprising: identifying, via a transceiver, a wearable device as a trial device to a wearable ensemble; and providing trial data corresponding to the trial device to a wearable ensemble system, the wearable ensemble system including the wearable ensemble.

In Example 17, the subject matter of Example 16 may optionally include providing a subset of wearable ensemble system data to a trial system, the trial system including the trial device.

In Example 18, the subject matter of Example 17 may optionally include, wherein the subset of wearable ensemble data is selected based on a user defined privacy classification.

In Example 19, the subject matter of Example 18 may optionally include, wherein the user defined privacy classification includes the classification public-data, and wherein the subset of wearable ensemble data is classified as public-data.

In Example 20, the subject matter of any of Examples 18-19 may optionally include, wherein the user defined privacy classification is a member of a set of privacy classifications, each of the set of privacy classifications having a corresponding key, and wherein the subset of wearable ensemble data is selected based on a correspondence between a first key provided by the trial system and a second key corresponding to the subset of wearable ensemble data.

In Example 21, the subject matter of Example 20 may optionally include, wherein the first key is obtained from a communication with the wearable ensemble system and provided by a trial system including the trial device.

In Example 22, the subject matter of any of Examples 16-21 may optionally include, wherein the trial data is generated by the trial device.

In Example 23, the subject matter of Example 22 may optionally include, wherein the trial data is generated by a sensor of the trial device.

In Example 24, the subject matter of any of Examples 16-23 may optionally include, wherein the trial data is pre-generated data that conforms to output of the trial device.

In Example 25, the subject matter of any of Examples 16-24 may optionally include, wherein the trial data is generated from a service that is included in the trial system.

In Example 26, the subject matter of any of Examples 16-25 may optionally include, wherein providing the trial data includes tagging the trial data, the tag permitting at least one of a service or device of the wearable ensemble system to identify the trial data and remove the trial data at the end of a trial period.

In Example 27, the subject matter of any of Examples 16-26 may optionally include, wherein providing trial data includes directing a member of the wearable ensemble system to store the trial data in segregated storage, the segregated storage being separately identifiable to the member from data provided by itself or another member of the wearable ensemble.

In Example 28, the subject matter of any of Examples 16-27 may optionally include, wherein identifying the wearable device as a trial device to the wearable ensemble includes receiving identification of the trial device from a point-of-sale system in a retailing venue.

In Example 29, the subject matter of any of Examples 16-28 may optionally include providing a report to a user of additional functionality of the wearable ensemble achieved by incorporation of the trial device into the wearable ensemble.

In Example 30, the subject matter of Example 29 may optionally include, wherein the additional functionality includes functionality provided by a service of the trial system.

In Example 31, may include subject matter such as a machine-readable medium including instructions that, when executed by a machine, cause the machine to perform any method of Examples 16-30.

Example 32 may include, or may optionally be combined with any of Examples 1-31 to include, subject matter (such as a system for pre-purchase wearable device testing) comprising: means for identifying, via a transceiver, a wearable device as a trial device to a wearable ensemble; and means for providing trial data corresponding to the trial device to a wearable ensemble system, the wearable ensemble system including the wearable ensemble.

In Example 33, the subject matter of Example 32 may optionally include, comprising means for providing a subset of wearable ensemble system data to a trial system, the trial system including the trial device.

In Example 34, the subject matter of Example 33 may optionally include, wherein the subset of wearable ensemble data is selected based on a user defined privacy classification.

In Example 35, the subject matter of Example 34 may optionally include, wherein the user defined privacy classification includes the classification public-data, and wherein the subset of wearable ensemble data is classified as public-data.

In Example 36, the subject matter of any of Examples 34-35 may optionally include, wherein the user defined privacy classification is a member of a set of privacy classifications, each of the set of privacy classifications having a corresponding key, and wherein the subset of wearable ensemble data is selected based on a correspondence between a first key provided by the trial system and a second key corresponding to the subset of wearable ensemble data.

In Example 37, the subject matter of Example 36 may optionally include, wherein the first key is obtained from a communication with the wearable ensemble system and provided by a trial system including the trial device.

In Example 38, the subject matter of any of Examples 32-37 may optionally include, wherein the trial data is generated by the trial device.

In Example 39, the subject matter of Example 38 may optionally include, wherein the trial data is generated by a sensor of the trial device.

In Example 40, the subject matter of any of Examples 32-39 may optionally include, wherein the trial data is pre-generated data that conforms to output of the trial device.

In Example 41, the subject matter of any of Examples 32-04 may optionally include, wherein the trial data is generated from a service that is included in the trial system.

In Example 42, the subject matter of any of Examples 32-41 may optionally include, wherein providing the trial data includes tagging the trial data, the tag permitting at least one of a service or device of the wearable ensemble system to identify the trial data and remove the trial data at the end of a trial period.

In Example 43, the subject matter of any of Examples 32-42 may optionally include, wherein providing trial data includes directing a member of the wearable ensemble system to store the trial data in segregated storage, the segregated storage being separately identifiable to the member from data provided by itself or another member of the wearable ensemble.

In Example 44, the subject matter of any of Examples 32-43 may optionally include, wherein identifying the wearable device as a trial device to the wearable ensemble includes receiving identification of the trial device from a point-of-sale system in a retailing venue.

In Example 45, the subject matter of any of Examples 32-44 may optionally include means for comprising providing a report to a user of additional functionality of the wearable ensemble achieved by incorporation of the trial device into the wearable ensemble.

In Example 46, the subject matter of Example 45 may optionally include, wherein the additional functionality includes functionality provided by a service of the trial system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for pre-purchase wearable device testing, the system comprising:
    a trial circuit-set to identify a wearable device as a trial device to a wearable ensemble, the trial device including at least one of a sensor or a sensor processor, the wearable ensemble including a plurality of devices that are authenticated to secure a personal network of a user of the wearable ensemble; and
    an exchange to provide trial data corresponding to the trial device to a wearable ensemble system, the wearable ensemble system including the wearable ensemble, the trial data including data that is produced by the at least one of the sensor or the sensor processor of the trial device, or data that is pre-generated and conforms to output of the at least one of the sensor or the sensor processor of the trial device when in normal operation, wherein, to provide the trial data, the exchange tags the trial data to segregate the trial data from other data of the wearable ensemble system, the tag permitting at least one of a service or device of the wearable ensemble system to identify the trial data and remove the trial data at the end of a trial period.

2. The system of claim 1, wherein the exchange is further to provide a subset of wearable ensemble system data to a trial system, the trial system including the trial device.

3. The system of claim 2, wherein the subset of wearable ensemble data is selected based on a user defined privacy classification.

4. The system of claim 3, wherein the user defined privacy classification is a member of a set of privacy classifications, each of the set of privacy classifications having a corresponding key, and wherein the subset of wearable ensemble data is selected based on a correspondence between a first key provided by the trial system and a second key corresponding to the subset of wearable ensemble data.

5. The system of claim 1, wherein to provide trial data includes the exchange to direct a member of the wearable ensemble system to store the trial data in segregated storage, the segregated storage being separately identifiable to the member from data provided by itself or another member of the wearable ensemble.

6. The system of claim 1, wherein to identify the wearable device as a trial device to the wearable ensemble includes the trial circuit-set to receive identification of the trial device from a point-of-sale system in a retailing venue.

7. The system of claim 1, comprising a profiler to provide a report to the user of additional functionality of the wearable ensemble achieved by incorporation of the trial device into the wearable ensemble.

8. The system of claim 7, wherein the additional functionality includes functionality provided by a service of the trial system.

9. A method for pre-purchase wearable device testing, the method comprising:
identifying, via a trial circuit-set, a wearable device as a trial device to a wearable ensemble, the trial device including at least one of a sensor or a sensor processor, the wearable ensemble including a plurality of devices that are authenticated to secure a personal network of a user of the wearable ensemble; and
providing trial data corresponding to the trial device to a wearable ensemble system, the wearable ensemble system including the wearable ensemble, the trial data including data that is produced by the at least one of the sensor or the sensor processor of the trial device, or data that is pre-generated and conforms to output of the at least one of the sensor or the sensor processor of the trial device when in normal operation, wherein providing the trial data includes tagging the trial data to segregate the trial data from other data of the wearable ensemble system, the tag permitting at least one of a service or device of the wearable ensemble system to identify the trial data and remove the trial data at the end of a trial period.

10. The method of claim 9, comprising providing a subset of wearable ensemble system data to a trial system, the trial system including the trial device.

11. The method of claim 10, wherein the subset of wearable ensemble data is selected based on a user defined privacy classification.

12. The method of claim 11, wherein the user defined privacy classification is a member of a set of privacy classifications, each of the set of privacy classifications having a corresponding key, and wherein the subset of wearable ensemble data is selected based on a correspondence between a first key provided by the trial system and a second key corresponding to the subset of wearable ensemble data.

13. The method of claim 9, wherein providing trial data includes directing a member of the wearable ensemble system to store the trial data in segregated storage, the segregated storage being separately identifiable to the member from data provided by itself or another member of the wearable ensemble.

14. The method of claim 9, wherein identifying the wearable device as a trial device to the wearable ensemble includes receiving identification of the trial device from a point-of-sale system in a retailing venue.

15. The method of claim 9, comprising providing a report to the user of additional functionality of the wearable ensemble achieved by incorporation of the trial device into the wearable ensemble.

16. The method of claim 15, wherein the additional functionality includes functionality provided by a service of the trial system.

17. At least one machine readable medium including instructions that, when executed by a machine, cause the machine to perform operations for pre-purchase wearable device testing, the operations comprising:
identifying, via a trial circuit-set, a wearable device as a trial device to a wearable ensemble, the trial device including at least one of a sensor or a sensor processor, the wearable ensemble including a plurality of devices that are authenticated to secure a personal network of a user of the wearable ensemble; and
providing trial data corresponding to the trial device to a wearable ensemble system, the wearable ensemble system including the wearable ensemble, the trial data including data that is produced by the at least one of the sensor or the sensor processor of the trial device, or data that is pre-generated and conforms to output of the at least one of the sensor or the sensor processor of the trial device when in normal operation, wherein providing the trial data includes tagging the trial data to segregate the trial data from other data of the wearable ensemble system, the tag permitting at least one of a service or device of the wearable ensemble system to identify the trial data and remove the trial data at the end of a trial period.

18. The at least one machine readable medium of claim 17, wherein the operations further comprise providing a subset of wearable ensemble system data to a trial system, the trial system including the trial device.

19. The at least one machine readable medium of claim 18, wherein the subset of wearable ensemble data is selected based on a user defined privacy classification.

20. The at least one machine readable medium of claim 19, wherein the user defined privacy classification is a member of a set of privacy classifications, each of the set of privacy classifications having a corresponding key, and wherein the subset of wearable ensemble data is selected based on a correspondence between a first key provided by the trial system and a second key corresponding to the subset of wearable ensemble data.

21. The at least one machine readable medium of claim 17, wherein providing trial data includes directing a member of the wearable ensemble system to store the trial data in segregated storage, the segregated storage being separately identifiable to the member from data provided by itself or another member of the wearable ensemble.

22. The at least one machine readable medium of claim 17, wherein identifying the wearable device as a trial device to the wearable ensemble includes receiving identification of the trial device from a point-of-sale system in a retailing venue.

23. The at least one machine readable medium of claim 17, wherein the operations further comprise providing a report to the user of additional functionality of the wearable ensemble achieved by incorporation of the trial device into the wearable ensemble.

24. The at least one machine readable medium of claim 23, wherein the additional functionality includes functionality provided by a service of the trial system.

* * * * *